(12) United States Patent
Jain et al.

(10) Patent No.: US 9,354,867 B2
(45) Date of Patent: May 31, 2016

(54) SYSTEM AND METHOD FOR IDENTIFYING, ANALYZING AND INTEGRATING RISKS ASSOCIATED WITH SOURCE CODE

(71) Applicant: OPSHUB, INC., Palo Alto, CA (US)

(72) Inventors: Sandeep Jain, Palo Alto, CA (US); Hardik Shah, Ahmedabad (IN)

(73) Assignee: OPSHUB, INC., Palo Alto, CA (US)

( * ) Notice: Subject to any disclaimer, the term of this patent is extended or adjusted under 35 U.S.C. 154(b) by 0 days.

(21) Appl. No.: 14/082,214

(22) Filed: Nov. 18, 2013

(65) Prior Publication Data

US 2015/0143335 A1    May 21, 2015

(51) Int. Cl.
*G06F 9/44*    (2006.01)

(52) U.S. Cl.
CPC ... *G06F 8/71* (2013.01); *G06F 8/70* (2013.01)

(58) Field of Classification Search
None
See application file for complete search history.

(56) References Cited

U.S. PATENT DOCUMENTS

| | | | |
|---|---|---|---|
| 7,503,037 B2 * | 3/2009 | Banerjee et al. | 717/124 |
| 7,958,445 B1 * | 6/2011 | Kuwamoto et al. | 715/237 |
| 8,539,282 B1 * | 9/2013 | Kabanov et al. | 714/38.1 |
| 2009/0144698 A1 * | 6/2009 | Fanning et al. | 717/120 |
| 2011/0022551 A1 * | 1/2011 | Dixon | 706/12 |
| 2011/0145650 A1 * | 6/2011 | Krauss | 714/38.1 |
| 2013/0024842 A1 * | 1/2013 | Browne et al. | 717/125 |
| 2013/0152047 A1 * | 6/2013 | Moorthi et al. | 717/124 |

* cited by examiner

*Primary Examiner* — Chat Do
*Assistant Examiner* — Douglas Slachta
(74) *Attorney, Agent, or Firm* — Barry Choobin; Patent 360 LLC

(57) ABSTRACT

The various embodiments herein provide a system and method for identifying, analyzing and integrating the risks associated with a source code. The system comprises a code coverage module for collecting and transforming the code coverage information by a file name, a source code analyzer module for collecting and transforming source code violations information by the file name, a software configuration management module for collecting and transforming the source code commit information by the file name, a risk analyzer processing module for receiving and relating the collected code coverage information, source code violations information and source code commit information with each other by the file name and a report generation module for publishing the processed result of the collected code coverage information, source code violations information and source code commit information in a report. The report is reviewed for identifying, analyzing and integrating risks associated with source code.

8 Claims, 3 Drawing Sheets

|  | Filename | com/abc/Sample.java |
|---|---|---|
| Code Coverage | Complexity | 5.0 |
|  | Line Hits | 20 |
|  | Total Lines | 40 |
|  | Line Coverage % | 50 |
|  | Branch Hits | 3 |
|  | Total Branches | 4 |
|  | Branch Coverage % | 75 |
| Source Code Analyzer | Priority1 Violation Count | 2 |
|  | Priority2 Violation Count | 0 |
|  | Priority3 Violation Count | 0 |
|  | Priority4 Violation Count | 4 |
|  | Priority5 Violation Count | 7 |
|  | Total Violation Count | 13 |
| SCM Info | Distinct User Count | 1 |
|  | Distinct Activity Count | 1 |
|  | Added Lines Count | 0 |
|  | Modified Lines Count | 20 |
|  | Deleted Lines Count | 0 |
|  | Total Delta Change Lines Count | 20 |
|  | Medium Defects Count | 0 |
|  | Low Defects Count | 0 |
|  | Critical Defects Count | 1 |
|  | High Defects Count | 2 |
|  | Total Defects Count | 3 |
|  | Defects Priority Weightage | 39 |

FIG. 3

SYSTEM AND METHOD FOR IDENTIFYING, ANALYZING AND INTEGRATING RISKS ASSOCIATED WITH SOURCE CODE

BACKGROUND

1. Technical Field

The embodiments herein generally relate to a method of identifying a high risk area of a source code. The embodiments herein particularly relate to a system and method of identifying a high risk area of a source code by observing various attributes and performing appropriate actions. The embodiments herein more particularly relate to a system and method for identifying, analyzing and integrating risks associated with source code.

2. Description of the Related Art

One of the components to identify risk associated with a source code is a code coverage tool through which data related to code coverage such as the part of JAVA code covered in testing is identified to determine the complexity of JAVA code.

In addition to basic code coverage, there can be additional metrics like delta code coverage which means that with this option, code coverage of only those lines in files which are changed after specific time can be identified. This option helps to make more meaningful decisions such as determining if there are some lines which have never been changed in last one year, and subsequently determining that the code coverage of those files is relatively less important when compared to code coverage of those lines which have been changed recently.

In code coverage techniques, merge code coverage results are merged to get combined code coverage result which helps in a situation like in one testing cycle, there is a possibility that whole testing is not completed, so it is possible that some code is tested on "Deployment run 1" and some other code is tested on "Deployment run 2". "Deployment run 2" may cover some already tested code of "Deployment run 1" and as well as it may cover some new code. With code coverage merge tool we can merge different code coverage results to get combined code coverage result.

Code coverage tools like Cobertura help get data including the part of JAVA code which is covered during testing and the complexity thereof. Later, this data can be analyzed to find out the classes which are highly complex and have a low coverage, so that those JAVA class files can be categorized as belonging to a high risk area. But only code coverage data is not sufficient to take an appropriate judgment/decision about defining a risk area for a source code. Other factors such as code commit information and source code file type information also need to be considered.

Hence there is a need for a system and method for identifying and analyzing the risks associated with a source code. There is also a need for a system and method that identifies a high risk area of a source code by observing various attributes and taking appropriate actions. Further, there is also felt a need for a system and method that provides for publishing the various attributes for the purpose of analysis of high risk areas of a source code.

The abovementioned shortcomings, disadvantages and problems are addressed herein and they would be understood by reading the following specification.

OBJECT OF THE EMBODIMENTS

The primary object of the embodiments herein is to provide a system and method for identifying and analyzing the risks associated with a source code.

Another object of the embodiments herein is to provide a method for identifying code coverage information, source code commit information and possible source code bugs/mistakes for analyzing the risks associated with source code.

Yet another object of the embodiments herein is to provide a method for publishing the various attributes in a report for analyzing a high risk area of source code.

These and other objects and advantages of the embodiments herein will become readily apparent from the following detailed description read in conjunction with the accompanying drawings.

SUMMARY

The various embodiments herein provide a system and method for identifying, analyzing and integrating risks associated with a source code. The system for identifying, analyzing and integrating the risks associated with source code comprises a code coverage module for collecting code coverage information and transforming the collected code coverage information by a file name, a source code analyzer module for collecting the source code violation information comprising bugs and mistakes and for transforming the collected source code violation information by the file name, and a software configuration management (SCM) module for collecting a source code commit information and converting the collected source code commit information by the file name.

The system further comprises a risk analyzer processing module connected to the code coverage module, the source code analyzer module and the software configuration management (SCM) module for receiving the information collected and processed with the code coverage module, the source code analyzer module and the software configuration management (SCM) module. The risk analyzer module interrelates the received code coverage information transformed with the file name, the source code violation information transformed by the file name and the source code commit information transformed by the file name, with each other by the file name. A report generation module is connected to the risk analyzer module that receives the output of the risk analyzer module for publishing the code coverage information, source code violation information and source code commit information in a report. The report is reviewed for identifying, analyzing and integrating the risks associated with the source code.

According to an embodiment herein, the code coverage module collects code coverage information comprising complexity of code, line and branch coverage corresponding to each file name. Further the code coverage module collects the code coverage information corresponding to JAVA files and complexity of JAVA code. The code coverage module identifies a line coverage and branch coverage indicating a tested part of a code.

According to an embodiment herein, the source code analyzer module identifies the common programming mistakes/bugs. The programming mistakes/bugs include unused variables, unnecessary object creation, possible null pointer exceptions, dead code, duplicate codes and overcomplicated expressions. The source code analyzer module transforms the collected source code violation information into a priority based violation count and stores the source code violation information by a file name.

According to an embodiment herein, the software configuration management module collects the source code commit information comprising committed information of plurality of files within a specific time period, user information corresponding to committed files, revision change information of lines for each of the files and defect information of committed files.

According to an embodiment herein, the defect information of committed files comprises high defects, medium defects, low defects and critical defects.

According to one embodiment herein, the computing system attribute information includes operating system information, database type, memory, and applications installed in the computing system.

According to an embodiment herein, the method for identifying, analyzing and integrating risks associated with source code comprises the steps of collecting a code coverage information form a code coverage module, transforming the collected code coverage information by a file name, collecting a source code violation information comprising bugs/mistakes by a source code analyzer module, transforming the collected source code violation information comprising bugs/mistakes, by the file name, collecting a source code commit information by the software configuration management module, transforming the collected source code commit information by the file name, receiving the code coverage information transformed with the file name, source code violation information transformed by the file name and source code commit information transformed by the file name by a risk analyzer processing module, processing and relating the received code coverage information, received source code violation information and received source code commit information with each other by the file name, and publishing the processed code coverage information, processed source code violation information and processed source code commit information in a report. The report is reviewed for identifying, analyzing and integrating risks associated with source code.

According to an embodiment herein, the source code commit information comprises a distinct user count, a distinct activity count, delta changes and a priority wise defect count.

According to an embodiment herein, the distinct user count comprises a count of the distinct users who have committed the particular file in a specific interval of time.

According to an embodiment herein, the distinct activity count comprises a count of the distinct activities in which a particular file is committed in a specific interval of time.

According to an embodiment herein, the delta changes for Added lines count comprises a total number of lines added in a particular file in a specified interval of time.

According to an embodiment herein, the delta changes for Modified Lines Count comprise a total number of lines modified in a particular file in a specified interval of time.

According to an embodiment herein, the delta changes for Deleted Lines Count comprise a total number of lines deleted in a particular file in a specified interval of time.

According to an embodiment herein, the priority wise defect count comprises a count of defects according to a priority for each individual file such as critical defects count, high defects count and medium defects count.

According to an embodiment herein, the code coverage information comprises line coverage and branch coverage, wherein the line coverage comprises line coverage percentage covered during testing, and the branch coverage comprises branch coverage percentage covered during testing such as if/else, switch statements, complexity of a class file.

These and other aspects of the embodiments herein will be better appreciated and understood when considered in conjunction with the following description and the accompanying drawings. It should be understood, however, that the following description, while indicating preferred embodiments and numerous specific details thereof, is given by way of illustration and not limitation. Many changes and modifications may be made within the scope of the embodiments herein without departing from the spirit thereof and the embodiments herein is to be construed as including all such modifications.

BRIEF DESCRIPTION OF THE DRAWINGS

The other objects, features and advantages will occur to those skilled in the art from the following description of the preferred embodiment and the accompanying drawings in which:

FIG. 3 illustrates a report with all information merged and integrated for each individual file for analyzing high risk area of source code, according to an embodiment herein.

Figure 1:
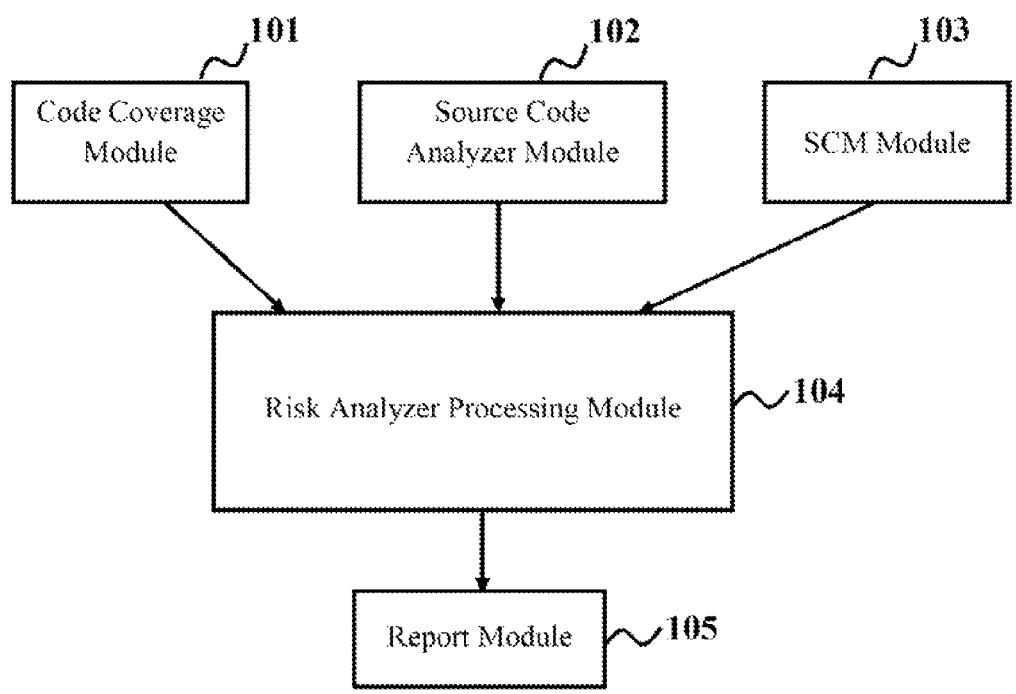
FIG. 1 illustrates a block diagram of a system for identifying, analyzing and integrating risks associated with source code, according to an embodiment herein.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a system and method for identifying, analyzing and integrating risks associated with a source code. The system for identifying, analyzing and integrating the risks associated with source code comprises a code coverage module for collecting code coverage information and transforming the collected code coverage information by a file name, a source code analyzer module for collecting the source code violation information comprising bugs and mistakes and for transforming the collected source code violation information by the file name, and a software configuration management (SCM) module for collecting a source code commit information and converting the collected source code commit information by the file name.

The system further comprises a risk analyzer processing module connected to the code coverage module, the source code analyzer module and the software configuration management (SCM) module for receiving the information collected and processed with the code coverage module, the source code analyzer module and the software configuration management (SCM) module. The risk analyzer module interrelates the received code coverage information transformed with the file name, the source code violation information transformed by the file name and the source code commit information transformed by the file name, with each other by the file name. A report generation module is connected to the risk analyzer module to receive the output of the risk analyzer module for publishing the code coverage information, source code violation information and source code commit information in a report. The report is reviewed for identifying, analyzing and integrating the risks associated with source code.

According to an embodiment herein, the code coverage module collects code coverage information comprising complexity of code, line and branch coverage for each file name. Further, the code coverage module collects the code coverage information for JAVA files and complexity of JAVA code. The code coverage module identifies a line coverage and branch coverage indicating a tested part of a code.

According to an embodiment herein, the source code analyzer module identifies the common programming mistakes/bugs. The programming mistakes/bugs include unused variables, unnecessary object creation, possible null pointer exceptions, dead code, duplicate codes and overcomplicated expressions etc. The source code analyzer module transforms the collected source code violation information into a priority based violation count and stores the source code violation information by a file name.

According to an embodiment herein, the software configuration management module collects the source code commit information comprising committed information of a plurality of files within specific time period, user information of committed files, revision change information of lines for each of the plurality of committed files and defect information of committed files.

According to an embodiment herein, the defect information of committed files comprises high defects, medium defects, low defects and critical defects.

According to one embodiment herein, the computing system attribute information includes operating system information, database type, memory, and applications installed in the computing system.

According to an embodiment herein, the method for identifying, analyzing and integrating risks associated with source code comprises the steps of collecting a code coverage information form a code coverage module, transforming the collected code coverage information by a file name, collecting a source code violation information comprising bugs/mistakes by a source code analyzer module, transforming the collected source code violation information comprising bugs/mistakes by the file name, collecting a source code commit information by the software configuration management module, transforming the collected source code commit information by the file name, receiving the code coverage information transformed with the file name, source code violation information transformed by the file name and source code commit information transformed by the file name by a risk analyzer processing module, processing and relating the received code coverage information, received source code violation information and received source code commit information with each other by the file name and publishing the processed code coverage information, processed source code violation information and processed source code commit information in a report. The report is reviewed for identifying, analyzing and integrating risks associated with source code.

According to an embodiment herein, the source code commit information comprises a distinct user count, a distinct activity count, delta changes and a priority wise defect count.

According to an embodiment herein, the distinct user count comprises a count of the distinct users who have committed the particular file in a specific interval of time.

According to an embodiment herein, the distinct activity count comprises a count of the distinct activities in which a particular file is committed in a specific interval of time.

According to an embodiment herein, the delta changes for Added lines count comprises a total number of lines added in a particular file in a specified interval of time.

According to an embodiment herein, the delta changes for Modified Lines Count comprise a total number of lines modified in a particular file in a specified interval of time.

According to an embodiment herein, the delta changes for Deleted Lines Count comprise a total number of lines deleted in a particular file in a specified interval of time.

According to an embodiment herein, the priority wise defect count comprises a count of defects according to a priority for each individual file such as critical defects count, high defects count and medium defects count.

According to an embodiment herein, the code coverage information comprises line coverage and branch coverage, wherein the line coverage comprises line coverage percentage covered during testing, and the branch coverage comprises branch coverage percentage covered during testing such as if/else loops, switch statements and loops, complexity of a class file.

FIG. 1 illustrates a block diagram of a system for identifying, analyzing and integrating risks associated with a source code, according to an embodiment herein. The system comprises a code coverage module 101, a source code analyzer module 102, a software configuration management module (SCM tool) 103, a risk analyzer processing module 104 and a report generation module 105. The code coverage module 101 collects the code coverage information and transforms the collected code coverage information by a file name. The source code analyzer module 102 collects the source code violation information comprising bugs/mistakes and transforms the collected source code violation information by the file name. The software configuration management module (SCM tool) 103 collects the source code commit information and transforms the collected source code commit information by the file name. The risk analyzer processing module 104 receives and processes the collected code coverage information transformed with the file name, collected source code violation information transformed by the file name and collected code commit information transformed by the file name, to relate the received code coverage information, the received source code violation information and the received source code commit information with each other by the file name. The report generation module 105 publishes the processed code coverage information, the processed source code violation information and the processed source code commit information in the report. The report is reviewed for identifying, analyzing and integrating risks associated with source code.

According to an embodiment herein, the code coverage module 101 collects code coverage information comprising complexity of code, line and branch coverage. Further the code coverage module collects code coverage information for JAVA files and complexity of JAVA code. The code coverage module identifies line coverage and branch coverage indicating tested part of a code.

According to an embodiment herein, the source code analyzer module 102 identifies common programming mistakes/bugs. The programming mistakes and bugs include unused variables, unnecessary object creation, possible null pointer exceptions, dead code, duplicate codes and overcomplicated expressions.

According to an embodiment herein, the software configuration management module (SCM-Code commit information) 103 collects the source code commit information comprising committed information corresponding to plurality of files within a specific time period, user information corresponding to committed files, revision change information of lines for each of the plurality of committed files and defect information of committed files.

According to an embodiment herein, the defect information of committed files comprises high defects, medium defects, low defects and critical defects. For each commit having relation with ALM Defect Id, for example, when ClearCase is used as the SCM tool and ClearQuest as ALM tool and once any commit is done on ClearCase activity, the ClearQuest has a relation with ClearQuest Defect Id, and that ClearQuest Defect Id includes priority like high, medium, critical.

Figure 2:
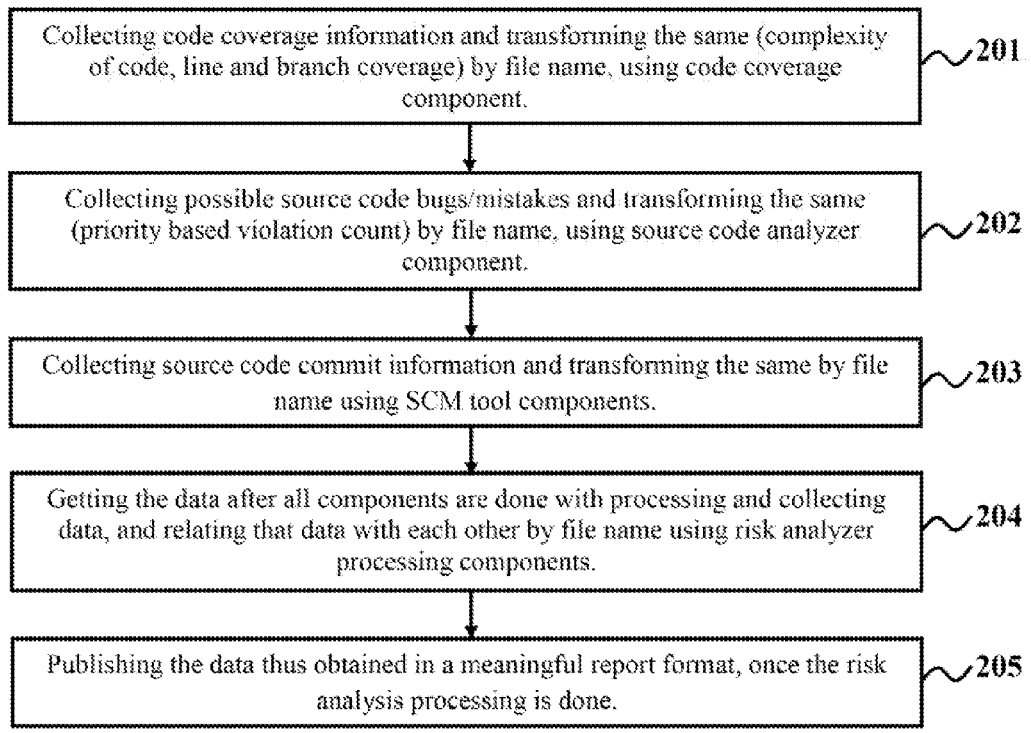
FIG. 2 illustrates a flow chart explaining a method of identifying, analyzing and integrating risks associated with source code, according to an embodiment herein.

FIG. 2 illustrates a flow chart explaining a method of identifying, analyzing and integrating risks associated with source code, according to an embodiment herein. The method comprises the steps of collecting code coverage information using a code coverage module and transforming the collected code coverage information by a file name (201), collecting source code violation information comprising bugs/mistakes by a source code analyzer module and transforming the collected source code violation information comprising bugs/mistakes by the file name (202), collecting source code commit information by the software configuration management module and transforming the collected source code commit information by the file name (203), receiving the code coverage information transformed with the file name, the source code violation information transformed by the file name and the source code commit information transformed by the file name by a risk analyzer processing module and relating the received code coverage information, the received source code violation information and the received code commit information with each other by the file name (204) and publishing results of processing of the received code coverage information, the received source code violation information and the received source code commit information in the report (205).

According to an embodiment herein, the collected source code commit information comprises a distinct user count, a distinct activity count, delta changes and a priority wise defect count.

According to an embodiment herein, the distinct user count comprises a count of the distinct users who have committed the particular file in a specific or preset interval of time. The method for calculating the distinct user count from code commit information comprises the steps of iterating each commit file information, getting the user name that committed that file, keeping that information stored in a "set data structure" and counting the total unique usernames per file in the "set data structure".

According to an embodiment herein, the distinct activity count comprises a count of the distinct activities in which a particular file is committed in a specific or preset interval of time. The method for calculating the distinct activity count from the code commit information comprises the steps of iterating each commit file information, getting the activity Id on which the file is committed, keeping that information stored in "set data structure" and counting the total unique activity Ids per file in the "set data structure".

According to an embodiment herein, the delta changes comprises the total number of lines changed in a particular file in a specified interval of time, and wherein the total number of lines changed includes any one of added lines, modified lines and deleted lines. The method for calculating the delta changes from the code commit information comprises the steps of iterating each commit file revision changes, comparing the file contents of current version to an older revision, storing the line change count numbers and processing added lines count, modified lines count, deleted lines count and total lines changes count per file.

According to an embodiment herein, the priority wise defect count comprises the count of defects according to its priority for each individual file such as critical defects count, high defects count and medium defects count.

According to an embodiment herein, the code coverage information comprises a line coverage and wherein the line coverage comprises a line coverage percentage covered during testing, a branch coverage and wherein the branch coverage comprises branch coverage percentage covered during testing such as if/else, switch and loops, complexity of a class file.

According to an embodiment herein, violations (Possible Bugs/mistakes) count for each file is counted with the code analyzer module and also the violations counts are obtained priority wise. Based on this information, the corresponding class files are improved.

According to an embodiment herein, with the SCM module, information regarding the files that are changed frequently, the files in which more changes are possible, the files that need to be tested more and the files with more coverage, are collected. Further the information/data like unique users, activity count per file, etc., are also collected. The code commit information is further related to ALM Defect Id and associate ALM defect priorities, so that a more filtered data which needs more attention is obtained based on the collect commit information to find various types of file such as JAVA, CSS, txt, xml etc.

According to an embodiment herein, the method and system helps in automating the process of manually getting/identifying and relating attributes for each file, in finding high risk area of source code.

FIG. 3 illustrates a report with code coverage information merged and integrated for individual files, according to an embodiment herein. The risk analyzer processing module of the system receives the code coverage information transformed with the file name, the source code violation information transformed by the file name and the source code commit information transformed by the file name. The risk analyzer processing module processes and relates the collected code coverage information, the collected source code violation information and the collected source code commit information with each other by the file name. Then the report generation module publishes a report 301 comprising the processing result of the collected code coverage information, the collected source code violation information and the collected source code commit information. The report is reviewed for identifying, analyzing and integrating risks associated with source code.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the embodiments herein with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A computer-implemented system for identifying, analyzing and integrating risks associated with a source code incorporated in a file, the system comprising a hardware processor and a hardware memory comprising:
 a code coverage module for collecting code coverage information, and wherein the collected code coverage information is saved by using a file name same as name of the file incorporating the source code, and wherein the code coverage information comprises a line coverage and a branch coverage and wherein the line coverage comprises line coverage percentage covered during testing and wherein the branch coverage comprises branch coverage percentage covered during testing of if/else, switch and loops, a complexity and wherein the complexity comprises complexity of a class file;
 a source code analyzer module for collecting source code violation information comprising bugs/mistakes, and wherein the collected source code violation information is saved by said file name;
 a software configuration management module for collecting source code data, wherein the plurality of source code data includes source code commit information, production code trace information, an error stack trigger location information, application monitoring and performance information, a computing system attribute information, a network bandwidth information, and wherein the collected source code commit information is saved by using said file name;
 a risk analyzer processing module for receiving and processing the collected code coverage information, the collected source code violation information and the collected source code commit information, and wherein the collected code coverage information, collected source code violation information and the collected source code commit information are related with each other by using said file name, and wherein the collected source code commit information comprises distinct user count, distinct activity count, delta changes and priority wise defect count, said distinct user count being a count of distinct users who committed a particular file within a specific interval of time, and said distinct activity count being a count of the distinct activities during which a particular file is committed within a specific interval of time, and wherein the delta changes comprise a count of total number of lines changed in a particular file in a specified interval of time, and wherein the count of total number of lines changed includes the count of at least one of added lines, modified lines and deleted lines; and
 a report generation module for publishing processing result of the collected collect code coverage information, the collected source code violation information and the collected source code commit information, in the form of a report.

2. The system according to claim 1, wherein the code coverage module collects the code coverage information comprising complexity of code, line and branch coverage, and wherein the line coverage and branch coverage indicates tested part of a code.

3. The system according to claim 1, wherein the source code analyzer module identifies bugs including unused variables, unnecessary object creation, possible null pointer exceptions, dead code, duplicate code and overcomplicated expressions.

4. The system according to claim 1, wherein the computing system attribute information includes operating system information, database type, memory, and applications installed in the computing system.

5. The system according to claim 1, wherein the software configuration management module collects the source code commit information comprising committed information of a plurality of files within a specific time period, user information corresponding to said plurality of files, revision change information of lines for each of the plurality of files and defect information corresponding to said plurality of files.

6. The system according to claim 5, wherein the defect information of committed plurality of files comprises information corresponding to high defects, medium defects, low defects and critical defects.

7. A method of identifying, analyzing and integrating risks associated with a source code incorporated in a file, the method comprises:
 collecting code coverage information using a code coverage module, and wherein the code coverage information comprises a line coverage and a branch coverage and wherein the line coverage comprises line coverage percentage covered during testing and wherein the branch coverage comprises branch coverage percentage covered during testing of if/else, switch and loops, a complexity and wherein the complexity comprises complexity of a class file;
 saving collected code coverage information by using a file name, said file name same as name of the file incorporating the source code;
 collecting source code violation information comprising information corresponding to bugs/mistakes using a source code analyzer module;
 saving collected source code violation information by using said file name;
 collecting source code commit information using a software configuration management module, and wherein the collected source code commit information comprises distinct user count, distinct activity count, delta changes and priority wise defect count, said distinct user count being a count of distinct users who committed a particular file within a specific interval of time, and said distinct activity count being a count of the distinct activities during which a particular file is committed within a specific interval of time, and wherein the delta changes comprise a count of total number of lines changed in a particular file in a specified interval of time, and wherein the count of total number of lines changed includes the count of at least one of added lines, modified lines and deleted lines;
 saving the collected source code commit information by using said file name;
 receiving and processing the collected code coverage information, the collected source code violation information and the collected source code commit information, using a risk analyzer processing module;
 relating the processed code coverage information, the processed source code violation information and the processed source code commit information with each other by using said file name; and
 publishing the processed code coverage information, the processed source code violation information and the processed source code commit information with relationship between each other in a report, and wherein the report is reviewed to identify, analyze and integrate the risks associated with source code.

8. The method according to claim 7, wherein the priority wise defect count comprises count of defects according to a priority for each individual file, and wherein the priority wise defect counts comprises a critical defects count, a high defects count and a medium defects count.

\* \* \* \* \*